United States Patent [19]

Crawford et al.

[11] Patent Number: 4,765,143

[45] Date of Patent: Aug. 23, 1988

[54] POWER PLANT USING $CO_2$ AS A WORKING FLUID

[75] Inventors: John T. Crawford, Naperville; Lewis Tyree, Jr., Oak Brook, both of Ill.; Harry C. Fischer, Maggie Valley, N.C.; Don H. Coers, Naperville, Ill.

[73] Assignee: CBI Research Corporation, Plainfield, Ill.

[21] Appl. No.: 10,685

[22] Filed: Feb. 4, 1987

[51] Int. Cl.$^4$ .................................... F01K 25/10
[52] U.S. Cl. ................................. 60/671; 60/651; 60/692; 60/685
[58] Field of Search .................... 60/651, 671, 692

[56] References Cited

U.S. PATENT DOCUMENTS

| | | | |
|---|---|---|---|
| 3,154,928 | 11/1964 | Harmens | 62/53 |
| 3,503,207 | 3/1970 | Strub | 60/36 |
| 3,579,982 | 5/1971 | Strub | 60/36 |
| 3,628,332 | 12/1971 | Kelmar | 60/105 |
| 4,127,008 | 11/1978 | Tyree, Jr. | 62/62 |
| 4,186,562 | 5/1980 | Tyree, Jr. | 62/62 |
| 4,224,801 | 9/1980 | Tyree, Jr. | 62/48 |
| 4,227,374 | 10/1980 | Oxley | 60/651 |
| 4,330,998 | 5/1982 | Nozawa | 60/655 |
| 4,429,536 | 2/1984 | Nozawa | 60/655 |
| 4,437,312 | 3/1984 | Newton et al. | 60/648 |
| 4,512,157 | 4/1985 | Weadock | 60/671 X |

OTHER PUBLICATIONS

J. Maertens, "Design of Rankine Cycles for Power Generation from Evaporating LNG," *Int. J. Refrig.*, vol. 9, pp. 137-143, May (1986).

*Primary Examiner*—Allen M. Ostrager
*Attorney, Agent, or Firm*—Fitch, Even, Tabin & Flannery

[57] ABSTRACT

A system for storing electrical energy in the form of triple-point $CO_2$ and then using such stored energy plus heat to generate electrical power. A reservoir of carbon dioxide liquid at about the triple point is created in an insulated vessel. Liquid carbon dioxide is withdrawn and pumped to a high pressure, which high pressure carbon dioxide is heated and expanded to create rotary power which generates electrical power. The discharge stream from the expander is cooled and returned to the vessel where carbon dioxide vapor is condensed by melting solid carbon dioxide. A fuel-fired gas turbine connected to an electrical power generator can be used to heat the high pressure carbon dioxide, and an ambient air stream flowing toward the gas turbine can be cooled by giving up heat to the high pressure carbon dioxide stream. The returning expanded carbon dioxide stream can be returned to a separate auxiliary vessel, and liquid carbon dioxide pumped from such auxiliary vessel to a main vessel wherein solid carbon dioxide is formed and then transferred to the auxiliary vessel.

21 Claims, 1 Drawing Sheet

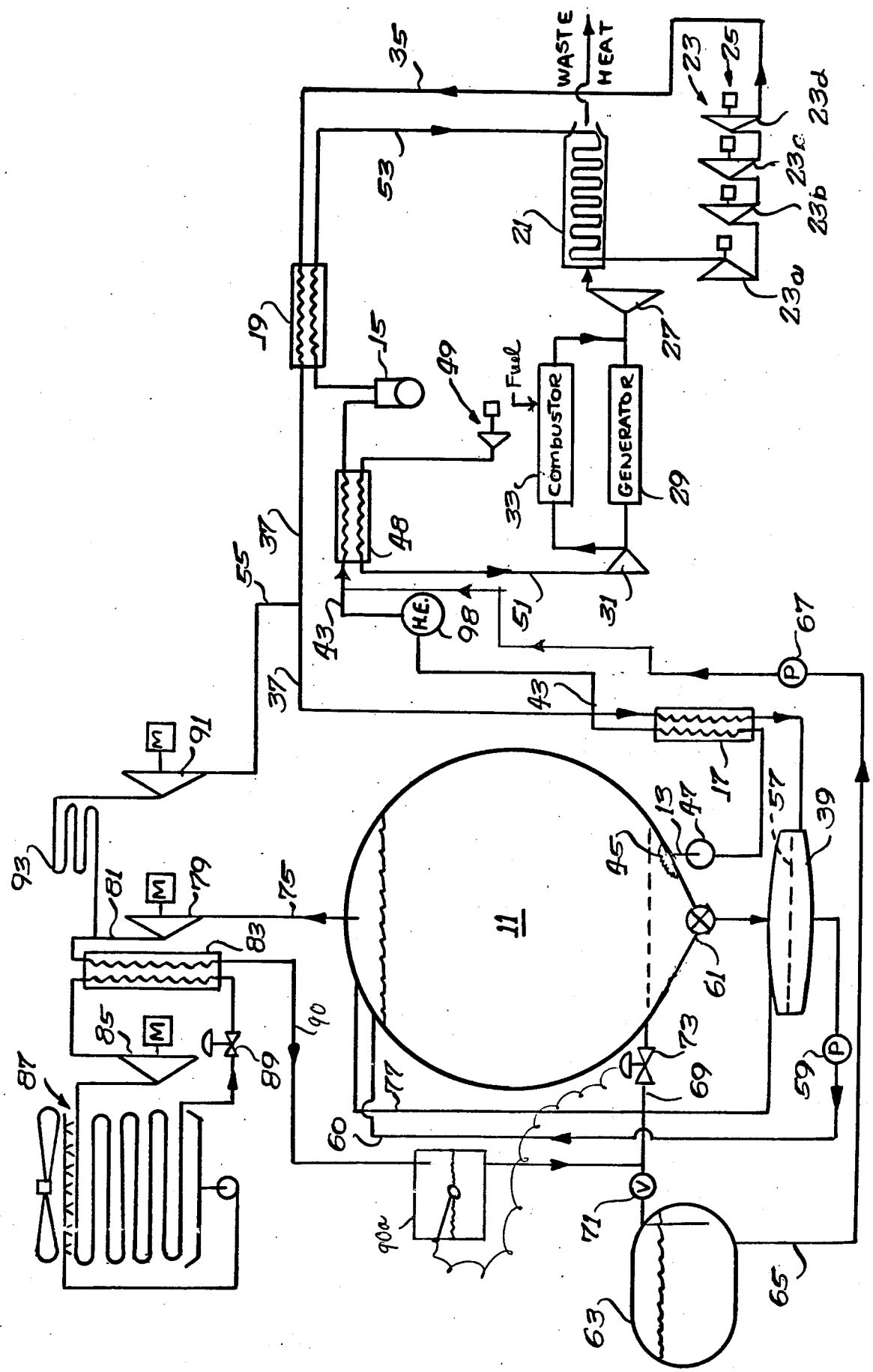

POWER PLANT USING CO2 AS A WORKING FLUID

The present relates to a plant for generating power, particularly electrical power, employing $CO_2$ as the working fluid and more particularly to such a plant having high capacity as a result of including a large reservoir of $CO_2$ at the triple point thereof.

BACKGROUND OF THE INVENTION

Electrical utilities in the United States and throughout the world are endeavoring to make better use of their base load power plants, whether coal-fired, gas- or oil-fired or nuclear. One operating procedure has been to have a system which accepts electricity during a period of low demand (thus allowing the continuing efficient operating level of the base load plant) in a manner that electricity can be returned to the power grid during a period of high demand. One system used to achieve this desired result is pumped water storage, wherein water is pumped to a higher vertical level during off-peak hours and allowed to run hydraulic turbines during peak hours to generate electricity which is fed onto the grid. Although up to about 70% of the energy used to charge this system is recovered upon discharge, the utilization of such a system is extremely site-specific to an appropriate geographic location and is very large, requiring a large storage volume per megawatt hour, and therefore expensive, requiring a lengthy construction period.

A second such system utilizes compressed air storage, with off-peak electrical power being used to compress air which is then stored in a closed salt cavern or mine or in an aquifer. During peak hours, the compressed air is used to burn fuel (e.g. gas or oil) which is then expanded through a power turbine to produce electrical power which is fed onto the grid. Again, such a system is site-specific, is dependent upon the gas-integrity of the storage region, requires a fairly large storage volume per megawatt hour but is also quite expensive per megawatt of installed capacity.

As an alternative to storing electrical power, electrical utilities have also investigated the employment of more efficient power generation systems. One more efficient way of electrical power generation is to employ a gas or oil-fired gas turbine as a part of a combined-cycle system. In such a system, the heat rejected by the higher temperature or topping cycle is used to drive the lower temperature cycle to produce additional power and operate at a higher overall efficiency than either cycle could by itself achieve. The lower temperature cycle is referred to as the bottoming cycle, and generally all bottoming cycles have been Rankine cycles which operate on the heat rejected, for example, by the gas turbine exhaust. Steam-bottoming cycles have been the most widely used. However, there have been some small demonstration-type plants which used organic working fluids, such as pyridine or toluene, which can be heated and expanded in a manner similar to steam. U.S. Pat. No. 3,257,806 is an example of such a power plant which proposes using a main steam cycle and a variety of organic materials as the working fluid in the bottoming cycle, such as butene, butyne and isobutylene.

Although these various systems may have certain advantages in a particular situation, the electrical power-generating industry and users of electrical power have continued to search for more efficient systems.

SUMMARY OF THE INVENTION

It has been found that surprising efficiencies can be achieved when carbon dioxide is used as a working fluid in a power-generating system by including a large reservoir wherein the carbon dioxide can be stored at the triple point and can, in this manner, produce a large amount of electrical power during the peak period of the day when electrical power usage is highest and then utilize electrical power to "recharge" the reservoir during those periods when the power companies have excess electrical power to sell. This system is, in effect, a closed cycle heat engine operation of the Rankine type with a depressed rejection temperature where there is a thermal storage capability and which uses carbon dioxide as its sole working fluid. A variety of sources of heat can be utilized, making this system particularly effective as a waste heat exchanger because of its ability to utilize relatively low level heat from other higher level cycles, for example the exhaust from a gas turbine. However, many other sources of heat, such as coal-fired combustors, including temperature-control heat exchangers in fluidized bed combustors, as well as heat from direct-fired gas or oil streams, can also be used. Available sources of refrigeration might also be employed and, if used, would render the overall system still more efficient; for example, there are large amounts of refrigeration available in liquified natural gas (LNG) which must generally be vaporized before it can be fed into a gas pipeline distribution system.

In addition to the overall conceptual system, the invention also provides a particular efficient method of its operation together with the removal and return of the carbon dioxide from the triple point storage. Inasmuch as storage in extremely large quantities are contemplated, for example a sphere perhaps 100 feet in diameter might conceivably be employed, it is important to be able to minimize the pressure head which the returning vapor must overcome, and an auxiliary insulated tank may be employed to achieve this desirable end.

More specifically, the invention in one aspect provides a system for storing energy and then using such stored energy plus heat to generate electrical power. Such system includes a insulated vessel for storing liquid carbon dioxide at its triple point and a refrigeration arrangement for creating a reservoir therein of carbon dioxide liquid at about its triple point containing a substantial amount of solid carbon dioxide. An arrangement is provided for withdrawing liquid carbon dioxide from the vessel, very substantially increasing the pressure of the withdrawn liquid and then heating this high pressure carbon dioxide. By expanding the carbon dioxide through an expander, such as a turbine, to dry vapor, or to vapor containing some entrained liquid, rotary power is created which is usually used to drive electrical power generating means but which could be used for other work.

The discharge stream from the turbine expander is cooled and returned to the insulated vessel where carbon dioxide vapor is condensed by melting solid carbon dioxide therein.

Furthermore, in another aspect, the invention provides a method for utilizing carbon dioxide slush in combination with the generation of electric power, by establishing a reservoir zone containing carbon dioxide slush at the triple point to a depth of at least about 15 feet, withdrawing liquid carbon dioxide from the reservoir zone, increasing its pressure, heating the pressurized carbon dioxide and then expanding the heated carbon dioxide in a manner to perform useful work in connection with the generation of electric power and create carbon dioxide vapor. By transferring a portion of the carbon dioxide slush from a main section of said reservoir zone to an auxiliary section thereof, the carbon dioxide vapor can be returned to a lower location in the auxiliary reservoir section where it is condensed to liquid by melting solid carbon dioxide, which liquid carbon dioxide is ultimately transferred from the auxiliary reservoir section to the main reservoir section.

pumped hydro storage or compressed air storage. Sizes as small as 10 to 20 megawatts appear to be cost effective; however larger sizes, up to 100 megawatts, do have the advantage of certain economies of scale.

The conversion efficiency referred to in Table 1 is the ratio of the electrical output divided by the electrical (and fuel, if any) input. This measure of efficiency is useful in the case of storage systems which use electrical input and get electrical output; however, it can become misleading when there are both electrical and fuel input to the storage system.

The second type of efficiency referred to is the delivery efficiency, which is based on the primary fuels used in the charging and discharging of the system. This

TABLE I
STORAGE TECHNOLOGY COMPARISONS

| Technology | Conversion % | Delivery % | Effective % | Size MW | Construction Time Years | Volume Cuft/MWH | Site Specific |
|---|---|---|---|---|---|---|---|
| COMPRESSED AIR | | | | | | | |
| Mini | 51 | 28 | 82 | 25–50 | 2.5 | 18,000 | YES |
| Maxi | 52 | 30 | 88 | 220 | 4.5 | 18,000 | |
| PUMPED HYDRO | | | | | | | |
| Conventional | 72 | 24 | 72 | 1,000 | 10 | 220,000 | YES |
| Underground | 72 | 24 | 72 | 2,000 | 14 | 220,000 | |
| SECO POWER CYCLE | | | | | | | |
| SECO I | 40 | 26 | 77 | 10 75 | 1.5 | 1,000 | NO |
| GT/SECO II | 42 | 33 | 96 | 10 75 | 1.5 | 500 | NO |

The advantages of the invention can be seen from Table I which presents a brief comparison of various of the systems presently available for storing electrical energy in another form. It points out the versatility of systems using a carbon dioxide triple point storage reservoir and that particular advantages can flow from employing a gas turbine with a $CO_2$ bottoming cycle where the cost per kilowatt is also less than comparable systems.

One of the primary advantages of the invention over other storage technologies is its greatly reduced storage volume, allowing it to be located virtually anywhere. A thousand kilowatt-hours (1 megawatt-hour) of storage in the case of a pumped hydro system, typically requires 220,000 cubic feet of water to be pumped up and stored in a high reservoir. This is a very large volume and is very site specific and of course impossible in flat country, or in areas where it is environmentally unacceptable. In the case of compressed air storage, the storage of one megawatt-hour of compressed air energy in a cavern typically requires 18,000 cubic feet of compressed air storage. The storage volume in the case of a direct-fired carbon dioxide storage system approximates only 1,000 cubic feet per megawatt-hour depending on both the percentage of the liquid $CO_2$ in the storage tank that is converted to solid and the efficiencies and conditions of the $CO_2$ power generating system. If the hot exhaust from a gas turbine is used, the carbon dioxide storage system requires only about 500 cubic feet of storage per megawatt hour of peak energy production, as roughly half the peak electrical output is provided by the gas turbine-generator. Because the storage volume is smaller and can be located above ground in pressure vessels manufactured with current technology, the storage costs are in line with or cheaper than those for pumped hydro storage and compressed air storage. Another advantage of the invention is that it can be cost effective in smaller sizes than is the case for either gives a better comparison for a system that has an electrical input plus a fuel input because it takes the primary fuel into consideration for both input and output.

The third efficiency represents the effectiveness of the storage plant in using the energy provided to it by the base load charging plant (per kilowatt-hour) divided by all the energy the storage plant uses per kilowatt-hour. Such effective efficiency is the delivery efficiency of the storage plant divided by the efficiency of the base load charging plant.

TABLE I compares different electrical power storage and generation systems which are presently available, stating the relative sizes of the systems for comparison purposes and setting forth pertinent parameters of the different systems.

BRIEF DESCRIPTION OF THE DRAWINGS

The FIGURE is a diagrammatic illustration of an electrical power generation system using carbon dioxide as the sole working fluid which incorporates various features of the invention.

DETAILED DESCRIPTION OF THE PREFERRED EMBODIMENT

The FIGURE shows an illustrative system which utilizes the unique and favorable characteristics of carbon dioxide at its triple point as an energy storage media and which also utilizes its thermodynamic properties as a refrigerant, a brine and a working fluid in an overall power cycle; it has been found that all of the foregoing contribute significantly to both the efficiency and the cost-effectiveness of such an overall electrical power generating cycle. Employment of such a cycle with only one working fluid, viz. carbon dioxide, allows energy storage and energy retrieval to occur in the triple point chamber without the potential cost and efficiency penalties inherent in heat exchangers, which would be necessary if two or more different fluids were employed.

Certain advantages of a stored energy carbon dioxide (SECO) system are evident by comparing the representations set forth in TABLE 1. A major advantage lies in the absence of any site-specificity with the $CO_2$ stored energy system and in striking contrast in required volume of working fluid that must be stored. The latter gives rise to a lower construction time which allows a purchaser to get a new system into operation relatively quickly to fill a projected near term need for additional capacity.

Although the preferred embodiment is illustrated which is termed the SECO II system, certain advantages of the invention are also present in the SECO I system where a direct-fired gas or oil combustor is used instead of the illustrated gas turbine. The concept of refrigeration storage at the triple point of $CO_2$ is common to both systems and allows the input of refrigeration into the system to be discontinuous—that is, it can be quite large at periods when off-peak power is available and can be zero during periods of high-peak power usage. Although the fuel input to the turbine is a cost of operation, the gas turbine is intended to be sized to provide about one-half of the electrical power capacity, and the use of $CO_2$ as both the working fluid for what amounts to a bottoming cycle and the media for the energy storage system at its triple point avoids inefficiencies in other competing systems.

Illustrated in the FIGURE is a system which includes a pressure vessel in the form of a sphere 11 that is appropriately insulated and designed to store carbon dioxide at its triple point of $-70°$ F. and 75 psia, at which it exists in the form of solid, liquid and vapor. Liquid $CO_2$ is preferably withdrawn from a lower location in the sphere through a line 13 leading to a first pump 47 which initially raises the pressure to about 800 psia, with this 800 psia liquid flowing through a heat exchanger 17. It then travels through line 43 to a high pressure pump 15 which raises the pressure to at least about 1000 psia, preferably to at least about 2000 psia and more preferably to about 4000 psia or above. The high pressure $CO_2$ then passes through a heat exchanger 19 where its temperature is raised to between about 100° and 150° F. and then through a main heat exchanger 21 where its temperature is preferably raised to at least about 500° F., more preferably to at least about 1000° F., and most preferably to above about 1600° F. The hot, high pressure carbon dioxide stream is then directed to the inlet of an expander 23, which may include a plurality of expansion stages. The expander is mechanically linked to an electrical power generator 25 which may also comprise a plurality of generator units. Alternatively, each expansion stage may be suitably connected to a single electrical generator.

In the preferred embodiment depicted in the FIGURE which is referred to as the SECO II system, the heating means for the main heat exchanger 21 is the hot exhaust gas from a gas turbine 27 which drives an electrical generator 29 and a compressor 31. Compressed air from the compressor 31 is fed to a combustor 33 along with a liquid or gaseous fuel to create the hot high pressure gas that drives the gas turbine 27.

The $CO_2$ vapor discharge from the expander 23 is routed through a line 35 which leads to the heat exchanger 19 where it passes in heat exchange relationship with the high pressure carbon dioxide, giving up some of its heat thereto, and then through a line 37 which leads through the heat exchanger 17 to an auxiliary insulated vessel or tank 39 which is partially filled with carbon dioxide slush. The temperature of the returning vapor is preferably lowered to at least about $-50°$ F. in the heat exchanger 17 before it enters the tank where it is condensed by melting solid $CO_2$ in the slush in the tank 39.

The system is capable of operating in a power-generating mode with the only substantial power requirement needed being that to drive the pump 47 and the high pressure pump 15. Accordingly, during periods of high-peak load, substantially all of the electrical power produced by the main generator 29 and by the generator means 25 connected to the expander 23 can be directed to fulfill electrical power requirements elsewhere in the plant, or it can be fed into the electrical power grid of an electrical utility. During periods of low-peak electrical power demand, the $CO_2$-slush-containing sphere 11 is "recharged" using the relatively inexpensive electrical power that is then available from the power grid. The equipment associated with the sphere 11 to accomplish this recharging is discussed in detail hereinafter.

More specifically, the insulated sphere 11 which serves as the main $CO_2$ storage vessel would be scaled to hold the requisite amount of $CO_2$ slush to be able to operate satisfactorily likely on a daily basis, or possibly for an entire week, which amount would be based upon the total number of high-peak hours, as determined by the local electrical utility, within the time period in question. Such a peaking arrangement would contemplate recharging the sphere during off-peak hours (which would usually encompass at least from midnight to 8:00 AM) and on weekends when off-peak electrical power is available. Power production and/or some recharging might take place during periods between such off-peak and high-peak hours. In any event, the storage vessel 11 could constitute a sphere about 50 to 100 feet or more in diameter. The storage vessel should be constructed of a suitable material, such as 9% nickel steel or stainless steel, that will be adequate at the triple point temperature. Likewise, insulation should be suitable for maintaining acceptable heat leakage therethrough from ambient to about $-70°$ F., for example, about 6 inches of commercially available polyurethane foam insulation might be used.

The storage vessel 11 should be designed to reasonably withstand an internal pressure of about 100 psia, and a suitable pressure release valve (not shown) would be provided so as to vent $CO_2$ vapor at such a design pressure and thus hold the contents of the vessel at about $-58°$ F. until such time as the associated refrigeration equipment deficiency, which allowed the rise in pressure above the triple point, can be corrected. Although a sphere may be the preferable design for the storage vessel, other types of suitable storage vessels could be used and might well be utilized for smaller capacity systems, such as those being designed to hold about 1000 tons of $CO_2$ or less; for example, smaller systems could utilize one or more cylindrical vessels, oriented horizontally, such as are commonly used at plants requiring relatively large amounts of liquid nitrogen or liquid carbon dioxide, which would present relatively larger amounts of surface area. Such tanks would of course be similarly insulated because the triple point pressure and temperature would be similarly maintained therewithin.

Liquid $CO_2$ flowing from the storage vessel 11 enters a line 13 which is preferably connected to a lower location in the sphere, and the entrance to the line 13 is preferably through a screen or like device 45 disposed interior of the storage vessel which allows the flow of only liquid $CO_2$ and prevents solid $CO_2$ from entering the line 13. In order to assure that the liquid $CO_2$ remains in liquid form as it flows through the heat exchanger 17 a small centrifugal pump 47 or the like is included in the line 13 which raises the pressure to about 800 psia and keeps the line 43 leading to the high pressure pump 15 full of liquid $CO_2$ at all times. The cold, approximately $-70°$ F. liquid $CO_2$ preferably passes through the heat exchanger 17 in which it takes up heat from the returning $CO_2$ vapor stream, as explained hereinafter in more detail.

If the overall system is to include a gas turbine 27, it is often beneficial to cool the inlet air to the compressor section 31 of the turbine, especially during the summer months when ambient air temperature and accordingly peak use of electrical power are at their highest. A heat exchanger 48 is provided for this purpose, which has sufficient heat exchange surface to, at the desired ambient air flow rate, cool ambient air from about 95° F. to about 40° F. The heat exchanger 48 is preferably operated in countercurrent flow condition and may raise the temperature of the liquid $CO_2$ in the line 43 to about 50° F. Ambient air is supplied by an electrically-powered blower 49 to the heat exchanger 48, and it thereafter travels through a duct 51 leading to the compressor 31. The electrical power output of the turbine 27 can be increased by about 16% by so cooling the inlet air. Of course, if a different source of heat is used, for example a simple fuel-fired heater, to raise the temperature of the $CO_2$, it would not be desired to cool the air which is used to combust the fuel.

The slightly warmed liquid $CO_2$ stream from the heat exchanger 48 is directed to the high pressure pump 15. The high pressure pump 15 takes its suction from the outlet of the heat exchanger 48 and raises the pressure of the liquid usually to between 3000 and 5000 psia; preferably a pressure of about 4000 psia is achieved. If the pump achieves an output pressure above the critical pressure of $CO_2$, i.e. about 1066 psia, the carbon dioxide is no longer in liquid and vapor form but instead becomes a supercritical fluid, as the liquid phase and the vapor phase become identical. Suitable pumps for achieving such operation are multicylinder, positive displacement pumps, such as those which have been developed for use in the oil fields for injection of $CO_2$ to obtain enhanced oil recovery from subterranean formations. The temperature of the liquid is raised about 20° in the high pressure pump so that it exits therefrom at a temperature of about 70° F.

This high pressure stream is then passed through the heat exchanger 19 where it flows in countercurrent heat exchange relationship with expanded, hot $CO_2$ vapor returning toward the sphere 11. It is advantageous to use this heat exchanger to raise the temperature of the stream to about 150° F., cooling the returning $CO_2$ vapor stream as explained hereinafter.

The high pressure stream then flows through a line 53 leading to the main $CO_2$ heat exchanger 21, which in the illustrated embodiment is heated by the exhaust from the gas turbine 27. It is believed that this arrangement is the most overall cost-effective way of heating the high pressure carbon dioxide because all of the gas turbine exhaust is sensible heat in the range of between 900°-1000° F. Countercurrent flow of the high pressure stream through the main heat exchanger 21 allows its temperature to rise to within about 50° F. of the turbine exhaust temperature, e.g. to about 940° F. A very efficient heat exchanger 21 can be provided by using stabilized stainless steel, fin-carrying tubes through which the incoming high pressure $CO_2$ stream would flow in heat exchange relationship with the turbine exhaust gases which would be on the shell side thereof. The exit temperature of the hot exhaust gas stream from the turbine 27 may be lowered to about 250° F. at the exit from the heat exchanger 21, at which point it would become waste heat with respect to this system.

The high pressure $CO_2$ stream exiting the main heat exchanger 21 is directed to the turbine-expander 23, which in the illustrated embodiment is a series of four stages, each being a radial inflow turbine expansion stage. This arrangement is designed to maximize the energy output from such a high pressure, high temperature stream by expanding it in stages through turbine-expanders individually designed for such pressure characteristics. Each of the individual stages 23a, b, c and d is shown as being mechanically linked to a separate generator unit although all may be suitably mechanically interconnected to a single electrical power generator 25 if desired. Alternately, a multistage, axial flow expander can be used in place of four separate radial inflow expanders.

By the time the $CO_2$ stream leaves the composite turbine-expander, it has preferably been expanded to a dry vapor; however, depending upon the particular operating conditions, the vapor could contain some minor amount of carbon dioxide liquid entrained therein which should not exceed about 10 weight percent of the $CO_2$. The temperature and pressure of the exit stream are based upon the overall system design. The pressure of the expanded $CO_2$ stream may be as low as about 80 psia and have a temperature of about 300° F. The effectiveness of the turbine-expander 23 is a function of the ratios of the inlet pressure to outlet pressure, and accordingly the lower the outlet pressure, the greater will be the effectiveness. In one particular aspect, described hereinafter, the $CO_2$ storage arrangement is designed to allow the pressure to be reduced as low as feasible, i.e. to a point of about 5 psi above the triple point pressure. If the returning $CO_2$ stream in the line 35 is at a temperature of about 300° F., its temperature may be dropped, for example, to about 95° F. in the heat exchanger 19.

The exit stream from the heat exchanger 19 flows through the line 37 while a branch line 55 departs from the line 37 for a purpose to be described hereinafter. The line 37 carries the returning vapor to the heat exchanger 17 which serves a function of a recuperator where the returning $CO_2$ passes in heat exchange relationship with the cold, triple point liquid leaving the storage vessel 11. The heat exchange surface is preferably such that countercurrent flow drops the temperature of the returning $CO_2$ to about $-55°$ F., and the vapor at a pressure of about 80 psia is bubbled into the auxiliary tank 39.

This auxiliary tank preferably has a device, such as a generally horizontal screen 57, which extends thereacross and divides it into an upper portion and a lower portion. The screen arrangement retains $CO_2$ slush in the upper portion and allows only $CO_2$ liquid in the lower portion. The returning $CO_2$ vapor is cooled to the triple point and condenses, causing melting of the solid portion of the $CO_2$ slush and thus creating additional liquid $CO_2$, both as a result of vapor condensation and as a result of the melting of solid within the auxiliary tank 39. In order to retain the desired liquid level in the auxiliary tank, a circulating pump 59 is preferably provided to withdraw liquid from the lower portion of the auxiliary tank and pump it through a line 60 to the main storage vessel 11 and preferably to an upper location therein.

In the illustrated embodiment, the auxiliary tank 39 is shown as being positioned vertically below the main storage vessel 11, which is the preferred arrangement that allows gravity flow of the dense $CO_2$ slush from the bottom of the main vessel through a suitable pressure-resistent valve 61 to supply this slush into the upper portion of the auxiliary tank 39. Any suitable valve 61, such as a rotary type valve known in the art to allow discharge from a relatively high pressure environment, can be used. The arrangement isolates the auxiliary tank 39 from the relatively higher pressure head which exists at lower regions within a large sphere filled with $CO_2$ slush at its triple point, for example a sphere that is 100 feet or more in diameter. The arrangement is found to have significant advantages whenever the $CO_2$ slush depth would exceed about 15 feet. This arrangement allows the $CO_2$ vapor to be returned to the overall storage system without having to pay the penalty of overcoming a high pressure head and results in the achievement of a surprisingly high overall efficiency for the entire system. If it is not feasible to position the auxiliary tank 39 vertically below the main storage vessel 11, a suitable transfer device, such as a screw conveyor or the like, may be used to remove $CO_2$ slush from a lower location in the storage vessel and transfer it to the upper region of the auxiliary tank.

The main storage vessel 11, which contains the liquid $CO_2$ at the triple point in the operating system, is usually first filled with liquid $CO_2$, and it may have a separate high pressure liquid $CO_2$ supply tank 63 associated with it. The tank 63 may be a conventional liquid $CO_2$ storage vessel designed to maintain liquid $CO_2$ at a temperature of about 0° F. and a pressure of about 300 psia, as is well known in the art. Should for some reason the high pressure pump 15 be unable to draw sufficient liquid $CO_2$ from the main storage vessel, a parallel supply path is provided via a line 65, which leads from the bottom of the supply tank 63 through a step-up pump 67, through heat exchanger 48 and then to the high pressure pump 15. Likewise, the storage vessel 11 can be resupplied with makeup $CO_2$ via a line 69 which contains a control valve 71 and a pressure regulatory valve 73 which closes if the upstream pressure falls below a desired level, e.g. 80 psia. and which leads to a lower location in the main storage vessel 11.

In general, removal of $CO_2$ vapor from the ullage or uppermost region of the storage vessel 11 through a line 75 causes the evaporation of liquid $CO_2$ at the upper surface of the liquid in the sphere 11, and the lowering of the temperature, which temperature drop continues until the body of liquid $CO_2$ with which the vessel was originally filled reaches the triple point of about 75 psia and −70° F. At this point, crystals of solid $CO_2$ form at the vapor-liquid interface and begin to slowly grow in size, with about 1.3 pounds of solid $CO_2$ being formed for every pound of liquid $CO_2$ that is vaporized. Because solid $CO_2$ has a greater density than liquid $CO_2$, the crystals begin to sink to the bottom of the vessel, forming which is referred to as $CO_2$ slush, a mixture of solid and liquid $CO_2$. It is considered feasible to maintain such a sphere with about 55 to about 75% of the total weight of the $CO_2$ contained therein being in the form of a solid $CO_2$. This solid $CO_2$, in the form of $CO_2$ slush, is withdrawn from the bottom of the storage vessel 11 through the valve 61 and supplied to the upper portion of the tank 39 above the screen 57. A pressure equalization line 77 is preferably provided to link the ullage space of the storage vessel 11 and that of the auxiliary tank 39 so as to keep the vapor pressures substantially equal in the upper regions of both tanks.

The $CO_2$ vapor removed through the line 75 is handled by a relatively conventional mechanical ation system to condense it to liquid $CO_2$ for ultimate return to the storage vessel 11 through the line 69 and the pressure-regulator valve 73. More specifically, the line 75 leads to the inlet of a $CO_2$ compressor 79 driven by a suitable electric motor, which compressor may be either a centrifugal compressor or a screw compressor. Preferably, a very good oil separator is provided at the outlet of the compressor 79 to prevent a buildup of oil in the sphere 11. The discharge pressure from the compressor 79 may be between about 300 and 375 psia. The discharge stream from the compressor 79 flows through a line 81 to a condenser 83 where it is condensed to liquid $CO_2$ for return to the sphere through the line 69. The condenser 83 may be cooled by evaporating a suitable refrigerant, such as ammonia or fluorocarbon $R_{22}$, which flows through the tube side of a tube-and-shell condenser, with the $CO_2$ being on the shell side thereof. Such a mechanical refrigeration system can be purchased as a package and usually includes a motor-driven compressor 85 which takes its suction from the evaporating refrigerant in the condenser 83, suitably increases its pressure and then discharges the high pressure refrigerant to an evaporative or air-cooled condenser 87, which preferably is the water-evaporative type utilizing a suitable air blower. The high pressure, condensed refrigerant is then expanded through an expansion valve 89 to the evaporator side of the condenser 83.

The liquid $CO_2$ from the condenser 83 travels through a line 90 which preferably contains a float-valve controlled surge tank 90a that assures the downstream section of the line 90 remains substantially filled with liquid $CO_2$ by causing the valve 73 to close if the liquid level in surge tank drops below a predetermined level.

The branch line 55 previously mentioned is optional; it leads to an auxiliary compressor 91 driven by a suitable motor which is designed to raise the pressure of the $CO_2$ to above about 300 psia, which compression might result in a vapor temperature rise to about 190° F. A suitable cooler 93 is provided to reduce the vapor temperature to about 100° F. prior to its joining vapor flowing in the line 81 leading to the condenser 83.

As previously indicated, the overall system is most efficiently operated by sizing the storage vessel 11 so that the compressors 79, 85 and 91 need not be operated during the periods of high-peak electrical power usage, so that only minimal energy need be expended to drive the pumps 15 and 47, thus maximizing electrical power generation during these periods when power generation is most critical. The greatest efficiency is achieved by running these compressors only during periods of less than peak power usage, and preferably only when electrical power is at its cheapest because the electrical utility system has excess power available which would not be otherwise utilized. During intermediate periods of only moderate electrical power demand, when the cost of power is somewhere between the high-peak cost and the low-peak cost but is usually closer to the low-peak cost, the main compressor 79 can be shut down and the compressor 91 utilized to transfer substantially all of the returning vapor directly to the condenser 83 and operating the refrigeration system including the compressor 85 to condense the returning vapor. Such operation may be termed base load operation and has an output about the same as a gas turbine with a steam bottoming cycle. Although power output is not as high as it would be in peak output operation, it is higher than when the main compressor 85 is being operated at full capacity.

A further advantage of the SECO system is that the power production (storage discharge) cycle can take place in either of two modes. The first mode is the production of power during which the vapor returning to the storage tank melts solid $CO_2$ to form liquid $CO_2$, without any $CO_2$ being lost to the atmosphere; in other words, the first mode, which was described hereinbefore, involves a closed system from which there is no discharge of $CO_2$ to the atmosphere. The second mode of operation involves emergency situations, after the solid $CO_2$ has been completely melted. At such time the system can go into emergency discharge and produce power at the rate of 120% of the closed cycle design rate; thus a 40 megawatt plant could produce 48 megawatts under emergency discharge operation. However, during such emergency discharge, $CO_2$ vapor is vented to the atmosphere and must subsequently be replenished before the system can return to full normal operation. Because, in many peaking operations, only three or four peak operating hours per day are required, an extension of the discharge period for several additional hours in an emergency discharge mode would still allow the system to be at least partially recharged for normal use the next day. This potential for extended use of storage (emergency discharge) is a feature of SECO which is unavailable from other storage technologies, such as pumped hydro or compressed air.

As earlier mentioned, a key advantage of the SECO system, especially compared to compressed air storage and pumped hydro, is its short construction time. Because most of the required system components are in current production and the storage vessels can be erected on site in less than 18 months, a short construction time for the total plant is possible. This minimizes the amount of money that must be tied up during plant construction, which is an important factor when competing plants may take 4 to 10 years to build. A typical 40 MW SECO plant could be sited on a one acre plot, and it would encounter few of the difficulties and delays associated with satisfying the technical and environmental concerns of much larger pumped hydro or compressed air installations.

Although the illustrated embodiment discloses the preferred utilization of hot exhaust from a gas turbine to provide the heat for vaporizing the high pressure $CO_2$ stream, other heating arrangements are possible, and if there should be sufficient waste heat available, utilization of such an inexpensive heat source may also have excellent overall efficiency. On the other hand, gas or oil-fired heaters suitable for supplying heat to a stream of high pressure $CO_2$ can be employed, and such a system, termed SECO I in TABLE I, can also be made more efficient by using recirculation of the high temperature gases to reheat the $CO_2$ between stages of expansion in a composite turbine expander 23. The greater efficiency of a turbine-expansion arrangement using such a concept of recirculating reheat is unfortunately not thermodynamically feasible when operating with the hot exhaust from a gas turbine. Alternatively, a fluidized-bed coal combustor, particularly one having suitable "in-bed" heat exchangers, or even a refuse burner can be used as gas reheaters to achieve a similar effect. Moreover, even solar energy may be used to heat a high pressure $CO_2$ stream, using the emerging technology that is developing more efficient solar heaters in the United States; this concept is particularly feasible because the period of high-peak power usage usually coincides with the hottest time of the day. Other prospective sources of high temperature heat include, geothermal, industrial process waste heat and the use of flare gas from a petrochemical or a landfill operation. Another particularly feasible system that might be used is an oxygen-donor $CO_2$ production combustion unit such as that disclosed in U.S. Pat. Nos. 4,309,198, 4,431,622 and 4,517,162, the disclosures of which are incorporated herein by reference.

Although the invention has been described with regard to its preferred embodiment, it should be understood that various changes and modifications as would be obvious to one having the ordinary skill in this art may be made without departing from the scope of the invention which is defined by the claims appended hereto. For example, one could take advantage of the potential refrigeration value of the cold $CO_2$ if the opportunity presents itself by including a heat exchanger 98 in the line 43 that could be used for frozen food applications, for air conditioning, etc. The application discusses $CO_2$ throughout as the preferred cryogen; however, other cryogens having similar characteristics, such as a favorable triple point to permit storage in the described manner, are considered equivalent and might be employed.

Particular features of the invention are emphasized in the claims which follow.

What is claimed is:

1. A system for storing energy and then using such stored energy plus heat to generate power, which system comprises insulated vessel means for storing liquid carbon dioxide at its triple point, means for creating a reservoir of carbon dioxide liquid at about the triple point thereof in said vessel means, which reservoir contains a substantial amount of solid carbon dioxide, means for withdrawing liquid carbon dioxide from said vessel means and very substantially increasing the pressure of said withdrawn liquid, means for heating said higher pressure carbon dioxide, means connected to an outlet from said heating means for expanding said heated carbon dioxide to dry vapor or to vapor containing some entrained liquid to create rotary power, and means for returning the discharge stream from said expanding means to said vessel means where carbon dioxide vapor is condensed by melting solid carbon dioxide therein.

2. A system in accordance with claim 1 wherein said withdrawing means comprises pump means capable of increasing said carbon dioxide pressure to at least about 1000 psia.

3. A system in accordance with claim 1 wherein said heating means is connected to a source of heat above ambient.

4. A system in accordance with claim 1 wherein a first heat-exchanger is provided which forms a part of said heating means and which is arranged to cool said returning lower pressure carbon dioxide stream, said high pressure carbon dioxide being passed therethrough in heat exchange with said discharge stream from said expanding means.

5. A system in accordance with claim 4 wherein said heating means includes a fuel-fired gas turbine connected to rotary electrical power generation means, and wherein rotary electrical power generating means is linked to said expanding means.

6. A system in accordance with claim 5 wherein said heating means also includes a second heat-exchanger connected for heat exchange between hot exhaust gases from said gas turbine and said high pressure carbon dioxide from said first heat-exchanger.

7. A system in accordance with claim 6 wherein said heating means also includes a third heat-exchanger connected for heat exchange between said high pressure carbon dioxide and an air stream flowing toward said gas turbine.

8. A system in accordance with claim 7 wherein a fourth heat-exchanger is connected between said reservoir and said pressure-increasing means so that heat from said returning lower pressure carbon dioxide stream is given up to said liquid stream flowing toward said pressure-increasing means.

9. A system in accordance with claim 1 wherein said vessel means includes a main vessel and a separate auxiliary vessel, wherein said returning carbon dioxide stream is returned to said auxiliary vessel, wherein pump means is provided for transferring liquid carbon dioxide from said auxiliary vessel to said main vessel, and wherein means is provided for transferring solid carbon dioxide from said main vessel to said auxiliary vessel.

10. A method for storing energy and then using such stored energy plus heat to generate electrical power, which method comprises the following steps
creating a reservoir of carbon dioxide at about the triple point thereof, which reservoir contains a substantial percentage of solid carbon dioxide,
withdrawing a stream of liquid carbon dioxide from said reservoir and very substantially increasing the pressure of said stream of withdrawn liquid,
heating said higher pressure carbon dioxide,
expanding said heated carbon dioxide to dry vapor or to vapor containing some entrained liquid to create rotary power,
using said rotary power to generate electrical power, and
returning the lower pressure stream to said reservoir where carbon dioxide vapor is condensed by melting solid carbon dioxide therein.

11. A method in accordance with claim 10 wherein the pressure of said withdrawn carbon dioxide is increased to at least about 1000 psia.

12. A method in accordance with claim 11 wherein said high pressure carbon dioxide is heated to at least about 500° F. prior to said expanding step.

13. A method in accordance with claim 12 wherein said lower pressure discharge stream from said expanding step is cooled to about −50° F. or lower before being returned to said reservoir.

14. Apparatus for utilizing carbon dioxide slush in combination with the generation of power, which apparatus comprises:
vessel means including a main vessel for holding carbon dioxide slush to an internal depth of at least about 15 feet,
refrigeration means associated with said vessel means for creating a reservoir of carbon dioxide slush at the triple point,
means for withdrawing liquid carbon dioxide from said vessel means, increasing the pressure of said withdrawn carbon dioxide, heating said pressurized carbon dioxide and expanding said heated carbon dioxide in a manner to perform useful work used in the generation of power and to create carbon dioxide vapor,
said vessel means also including an auxiliary vessel,
means for transferring carbon dioxide slush from said main vessel to said auxiliary vessel,
means for returning said carbon dioxide vapor to said auxiliary vessel where it is condensed to liquid by melting solid carbon dioxide, and
means for transferring liquid carbon dioxide from said auxiliary vessel to said main vessel.

15. Apparatus according to claim 14 wherein said auxiliary vessel is located at a lower vertical level than said main vessel and said transfer of slush is assisted by gravity.

16. Apparatus according to claim 14 wherein separation means through which liquid $CO_2$ but not solid $CO_2$ will pass divides said auxiliary vessel into an upper portion and a lower portion from which liquid $CO_2$ is transferred to said main vessel.

17. Apparatus according to claim 14 wherein high pressure positive displacement pump means is provided for pressurizing said withdrawn liquid carbon dioxide and rotary expander means is provided for expanding said heated carbon dioxide.

18. Apparatus according to claim 17 wherein effluent from a combustion unit for generating electric power is provided for heating said pressurized carbon dioxide and wherein electrical generator means is linked to said carbon dioxide rotary expander means to utilize the power generated.

19. A method for utilizing carbon dioxide slush in combination with the generation of electric power, which method comprises:
establishing a reservoir zone containing carbon dioxide slush at the triple point to a depth of at least about 15 feet,
withdrawing liquid carbon dioxide from said reservoir zone, increasing the pressure of said withdrawn carbon dioxide, heating said pressurized carbon dioxide and expanding said heated carbon dioxide to create carbon dioxide vapor in a manner to perform useful work in connection with the ultimate generation of electric power,
transferring a portion of said carbon dioxide slush from a main section of said reservoir zone to a separate auxiliary section thereof,
returning said carbon dioxide vapor to said auxiliary reservoir section in a manner so that it is condensed to liquid by melting solid carbon dioxide, and
transferring liquid carbon dioxide from said auxiliary reservoir section to said main reservoir section.

20. A method according to claim 19 wherein said transfer of slush is by gravity flow.

21. A method according to claim 19 wherein said withdrawn carbon dioxide is heated by heat exchanger with returning $CO_2$ vapor, is thereafter pressurized to as least about 1000 psia and heated to at least about 500° F.

* * * * *